INVENTOR.
ERIC C. HOPKINSON
BY
AGENT

3,371,312
PULSE SEPARATION CIRCUIT

Eric C. Hopkinson, Houston, Tex., assignor to Dresser Industries, Inc., Dallas, Tex., a corporation of Delaware
Continuation of application Ser. No. 774,253, Nov. 17, 1958. This application Nov. 23, 1964, Ser. No. 414,518
3 Claims. (Cl. 340—18)

This application is a continuation of my copending application Ser. No. 774,253, filed Nov. 17, 1958, now abandoned.

This invention relates to pulse separation circuits and is particularly directed to novel means for separating positive and negative pulse signals which have been transmitted over a long conductor.

In the art of radioactivity well logging, a subsurface instrument, containing one or more radiation detectors, such as Geiger or proportional counters or scintillation counters, is suspended in a borehole by means of a cable. Detectors of the type described emit pulse type signals, and these signals must be transmitted from the subsurface instrument over an electrical conductor contained in the suspending cable to a suitable surface unit in which the information from the subsurface instrument may be recorded or otherwise utilized. Since the borehole may penetrate several miles into the earth, the cable over which the signals are transmitted must be very long and pulses sent over the cable are usually badly distorted and have considerable overshoot, introduced by the time they reach the opposite end of the cable. Moreover, where one channel of information is transmitted as positive pulses and a second channel is transmitted as negative pulses, some means must be provided for removing the pulses from the cable and for separating the pulses according to polarity.

In the past, it has been customary to provide a pulse transformer for removing the pulses from the cable and to suitably invert the pulse channel so that positive pulses are applied to vacuum tubes biased to cutoff or provide opposite poled rectifiers to receive the output of the pulse transformer and to pass only pulses of a corresponding polarity. Unfortunately, in addition to passing the distortion caused by the long cable, pulse transformers usually add to the overshoot pulses of each polarity. Accordingly, separation by such means is not clean and each of the separated channels will contain overshoot pulses from the other channel which may approach the size of the "true" pulses. Consequently, several stages of amplification and discrimination are necessary to distinguish the signal pulses from the overshoot pulses and, at best, the ratio of pulse to overshoot is generally not very large.

These disadvantages of the prior art are overcome with the present invention and an extremely simple circuit is provided for removing the pulses from the cable and separating them into separate channels according to polarity. Furthermore, the circuit of the present invention substantially eliminates overshoot while greatly amplifying the signal pulses thereby tremendously increasing the signal to overshoot ratio and eliminating the necessity for additional stages of amplification and discrimination.

The advantages of the present invention are preferably attained by connecting NPN and PNP transistors in parallel with each other and in series with the cable and biasing the transistors to pass only pulses of a respective polarity.

Accordingly, it is an object of the present invention to provide novel means for separating positive and negative pulse type signals into two separate channels each containing only pulses of a respective polarity.

Another object of the present invention is to provide novel means for separating positive and negative pulse type signals into two separate channels without requiring additional stages of amplification and discrimination.

A specific object of the present invention is to provide a novel means for removing positive and negative pulse type signals from a common conductor and separating the signals into two separate channels by connecting NPN and PNP transistors in parallel with each other and in series with said conductor and biasing the transistors to pass only pulses of a respective polarity.

These and other objects and features of the present invention will be apparent from the following description wherein reference is made to the figures of the accompanying drawing.

Figure 1:
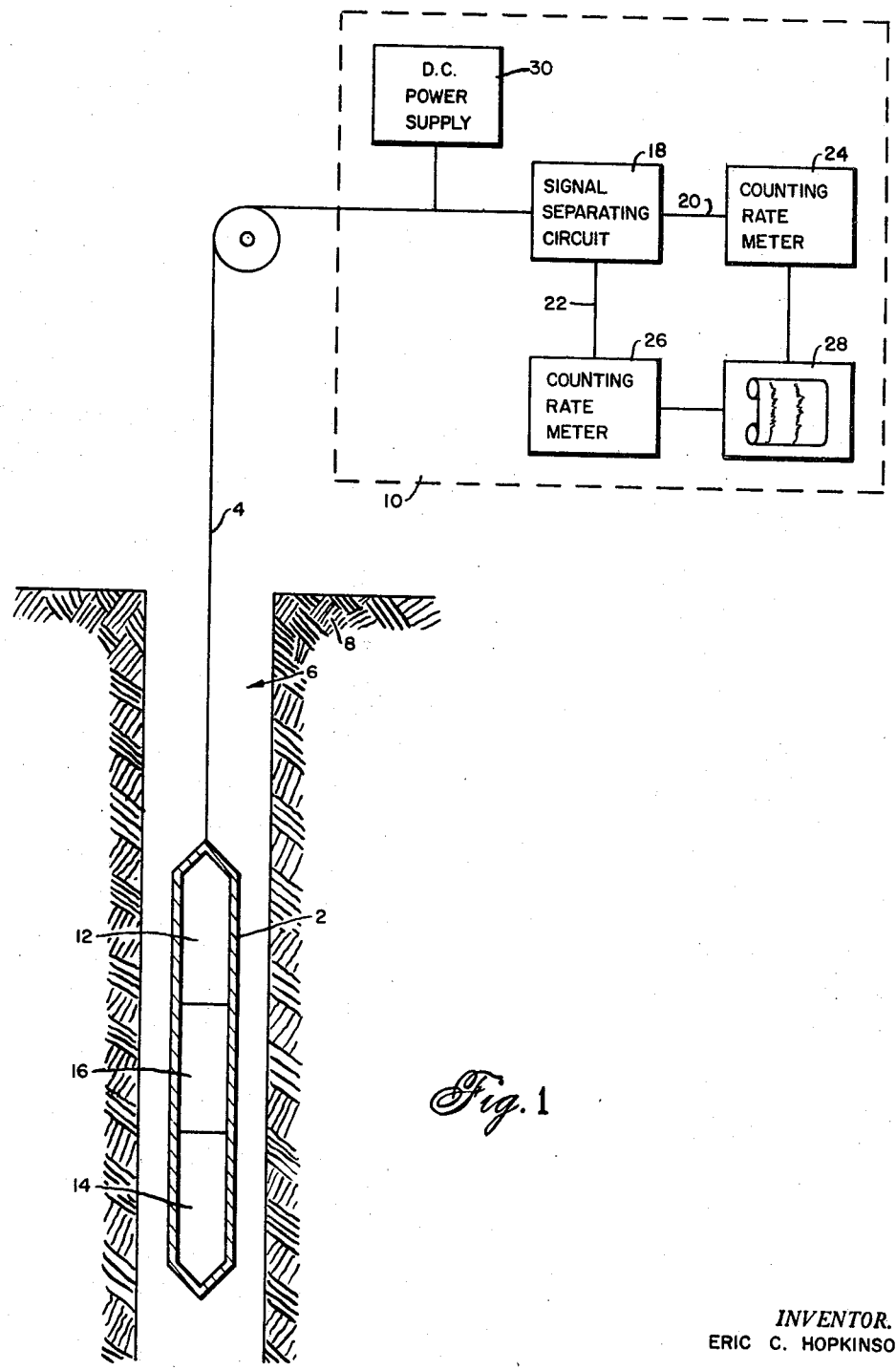
FIG. 1 is a view, partly in section, of a typical radioactivity well logging system embodying the present invention.

In that form of the present invention chosen for purposes of illustration in the drawing, FIG. 1 shows a subsurface instrument 2 suspended by means of a cable 4 in a borehole 6 which penetrates the earth 8. The cable 4 supports the subsurface instrument 2 and also contains one or more electrical conductors which serve to connect the subsurface instrument 2 to a suitable surface unit 10 at the surface of the earth. The subsurface instrument 2 comprises an electronic portion 12 and two radiation detectors 14 and 16 which each emits pulse type signals. The signals from one of said detectors, such as detector 14, are converted by the electronic portion 12 to pulses of negative polarity while the signals from the other detector, in this case, detector 16, are converted by the electronic portion 12 to pulses of positive polarity. The positive and negative pulses are then applied to a single conductor of cable 4 for transmission to the surface unit 10. In the surface unit 10, the signals are removed from the cable 4 and are separated by signal separating circuit 18 into two separate channels, each containing pulses of a respective polarity. Thus, conductor 20 carries only pulses corresponding to the signals from detector 14 while conductor 2 carries only pulses corresponding to the signals from detector 16. The pulses in each channel are passed from the signal separating circuit 18 to respective counting rate meters 24 and 26 and the outputs of the counting rate meters 24 and 26 are supplied to a suitable recorder 28 for recording. The surface unit 10 also comprises a suitable direct current power supply 30 for providing power for the subsurface instrument 2.

Figure 2:
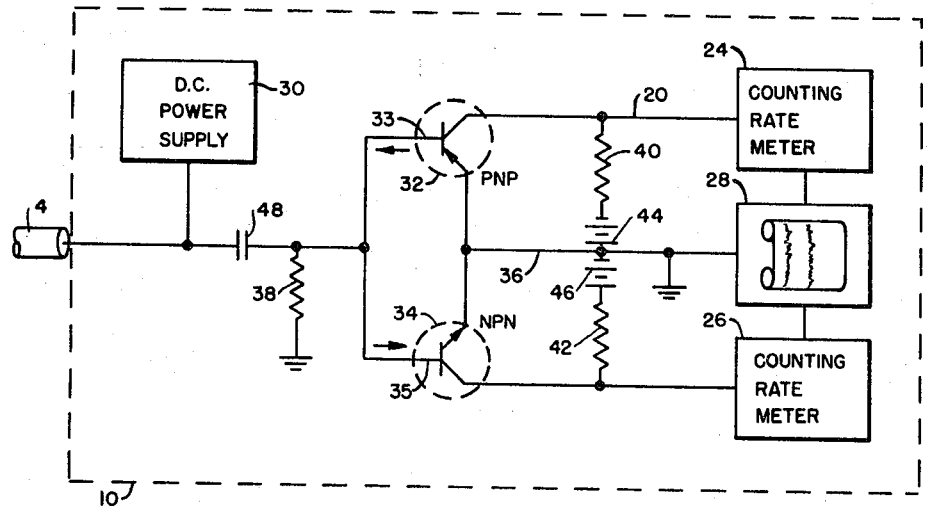
FIG. 2 is a diagrammatic representation of the surface unit of the device of FIG. 1.

In FIG. 2, the surface unit 10 is shown in greater detail, particularly showing the pulse separating circuit. As shown, a PNP transistor 32 and an NPN transistor 34 have their emitters connected together to ground through conductor 36 while the bases are connected together and substantially zero bias is maintained between the emitters and bases of the transistors 32 and 34 by resistor 38. Resistors 40 and 42 are collector load resistors and voltage sources 44 and 46 serve to energize the collectors of the respective transistors. Capacitor 48 merely serves to keep direct current from the power supply 30 out of the pulse circuits. With this arrangement, transistor 32 is normally non-conductive. However, when a negative pulse is applied to the base 33 of transistor 32, the transistor becomes conductive and sends an amplified pulse to counting rate meter 24. Conversely, transistor 34 is normally non-conductive but becomes conductive when a positive pulse is applied to the base 35 of transistor 34 and sends an amplified pulse to counting rate meter 26. Thus, transistor 32 will effectively pass pulses from detector 14 while blocking pulses from detector 16. On the other hand, transistor 34 will effectively pass pulses from detector 16 but will block pulses from detector 14.

Figure 3:
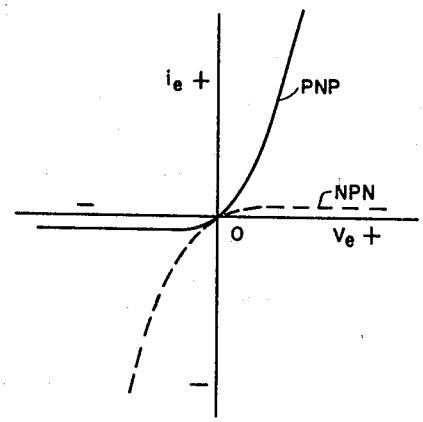
FIG. 3 is an illustration of the emitter-base diode characteristic for transistors.

FIG. 3 illustrates the emitter-base diode characteristic for transistors. The characteristic is shown in a solid line for PNP transistors and in a dotted line for NPN transistors. Thus, for a PNP transistor, when the emitter is positive with respect to the base, the transistor will be highly conductive, whereas when the emitter is negative with respect to the base, the transistor will be relatively non-conductive. For NPN transistors these same results are obtained with the opposite polarities. As seen in FIGS. 2 and 3, any negative voltage applied to the bases 33 and 35 of transistors 32 and 34 will result in a large collector current from PNP transistor 32 and only a very small collector current from NPN transistor 34. Conversely, any positive voltage applied to the bases 33 and 35 of transistors 32 and 34 will result in a very small collector current from PNP transistor 32 and a very large collector current from NPN transistor 34. Thus, transistor 32 will effectively pass only negative pulses while transistor 34 will effectively pass only positive pulses. It should be understood that, while the shape of the characteristic curve will be substantially the same for all transistors, the position of the "knee" of the curve will be determined by the particular transistor employed. Since the "true" pulses will be somewhat larger than the overshoot pulses when the signals are removed from the cable 4, the transistors 32 and 34 are preferably chosen to have characteristics which will prevent the overshoot pulses from driving the transistors beyond the knee of the characteristic curve. Hence, the collector currents resulting from the "true" pulses will be much larger than the collector currents resulting from the overshoot pulses. In actual practice, it has been found that the currents resulting from the "true" pulses may be several orders of magnitude larger than the currents resulting from the overshoot pulses. Consequently, the effect of the overshoot pulses may be ignored. Where, for any reason, a particular transistor must be employed which does not have the desired characteristic, a similar result may be obtained by suitably varying the value of resistor 38 to provide the desired pulse amplitude between the base and emitter of the transistor. In operation, signals from detectors 14 and 16 may be converted respectively to negative and positive pulse signals by the electronic portion 12 of the subsurface instrument 2 and both signals are then applied to the cable 4 for transmission to the surface of the earth. At the surface, the pulse signals pass capacitor 48 and are applied simultaneously to the bases 33 and 35 of transistors 32 and 34. As noted above, transistor 32 becomes conductive only upon receipt of negative signals. Consequently, the negative pulses representing the signals from detector 14 will render transistor 32 conductive and amplified pulses will be sent to counting rate meter 24 while the positive pulses will be blocked. On the other hand, transistor 34 is connected to block negative signals but to be made conductive by positive signals. Thus, the positive pulses representing the signals from detector 16 will cause transistor 34 to conduct and send amplified pulses to counting rate meter 26. The counting rate meters 24 and 26 serve to measure the repetition rate of pulses in their respective channels and provide a signal indicative of this to recorder 28.

Numerous variations and modifications of the present invention may obviously be made without departing from the invention. Accordingly, it should be clearly understood that the form of the invention described above and shown in the figures of the accompanying drawing is illustrative only and is not intended to limit the scope of the invention.

What is claimed is:

1. Apparatus for radioactivity well logging comprising a subsurface instrument; a transformerless surface unit; and a cable suspending said subsurface instrument in a borehole to be logged; said cable including at least one electrical conductor connecting said subsurface instrument to said surface unit; said subsurface instrument including a source of low level negative pulses having positive overshoots, a source of low level positive pulses having negative overshoots, and means for impressing pulses from both of said sources on the conductor of said cable for transmission to the surface of the earth; said transformerless surface unit including an NPN transistor, means maintaining substantially zero bias between the base and emitter of said NPN transistor, a PNP transistor, means maintaining substantially zero bias between the base and emitter of said PNP transistor means maintaining the respective emitters of said transistors at a fixed potential, means connecting the bases of said transistors directly together and capacitively to the conductor of said cable, the base-to-emitter diode being such as to conduct on the application of pulses and to be non-conductive on the application of overshoots whereby the pulses are separated into two channels and amplified without appreciable amplification of the overshoots thereby substantially improving the pulse to overshoot ratio, the first signal receiving means connected to receive signals from said NPN transistor indicative of the pulses emitted by said source of positive pulses, and second signal receiving means connected to receive signals from said PNP transistor indicative of the pulses emitted by said source of negative pulses.

2. A system for logging a borehole comprising:
   a subsurface instrument including a source of low level negative pulses of lesser amplitude than the pulse, having positive overshoots and a source of low level positive pulses having negative overshoots of lesser amplitude than the pulse,
   a cable suspending the subsurface instrument in the borehole, said cable including at least one electrical conductor,
   means in the subsurface instrument for impressing the pulses from both sources in the subsurface instrument on the conductor for transmission to the surface of the earth,
   a transformerless surface unit including an electronic pulse separation circuit connected to the conductor of said cable, said pulse separation circuit comprising an NPN transistor, a PNP transistor, a first direct current conductive means connecting the emitters of said transmitters together and to a ground, a second direct current conductive means connecting the bases of said transistors together, means maintaining the base-to-emitter bias of both transistors substantially at zero, direct current connected to energize the collectors of said transistors simultaneously, a means supplying pulses to be separated to said second conductive means, the base-to-emitter diode being such as to conduct on the application of pulses and to be non-conductive on the application of overshoots.

3. A system for logging a borehole comprising:
   a subsurface instrument including a source of low level negative pulses having positive overshoots of a lesser amplitude and a source of low level positive pulses having negative overshoots of a lesser amplitude, a cable having at least one electrical conductor suspending the subsurface instrument in the borehole, means in the subsurface instrument for impressing the pulses from both sources in the subsurface instrument on the conductor of said cable for transmission to the surface of the earth, transistor circuit means at the surface of the earth transformerlessly connected to the conductor of the cable receiving the pulses and their overshoots separating the pulses into two channels, the transistor circuit means having a base-to-emitter diode such as to conduct on the application of pulses and to be non-conductive on the application of overshoots thereby amplifying the pulses without appreciably amplifying the overshoots so that there is an increased pulse to overshoot ratio facilitating discrimination directed at the elimination of noise and other extraneous matter from the pulse signal.

References Cited

UNITED STATES PATENTS

| | | |
|---|---|---|
| 2,782,267 | 2/1957 | Beck. |
| 2,942,112 | 6/1960 | Hearn _____ 340—18 X |
| 3,079,549 | 2/1963 | Martin _____ 340—18 X |

BENJAMIN A. BORCHELT, *Primary Examiner.*

R. M. SKOLNIK, *Assistant Examiner.*